Nov. 13, 1945.　　　　S. GRUBICH　　　　2,389,044
MATERIAL DIGGING AND HANDLING APPARATUS
Filed June 27, 1944　　　4 Sheets-Sheet 1
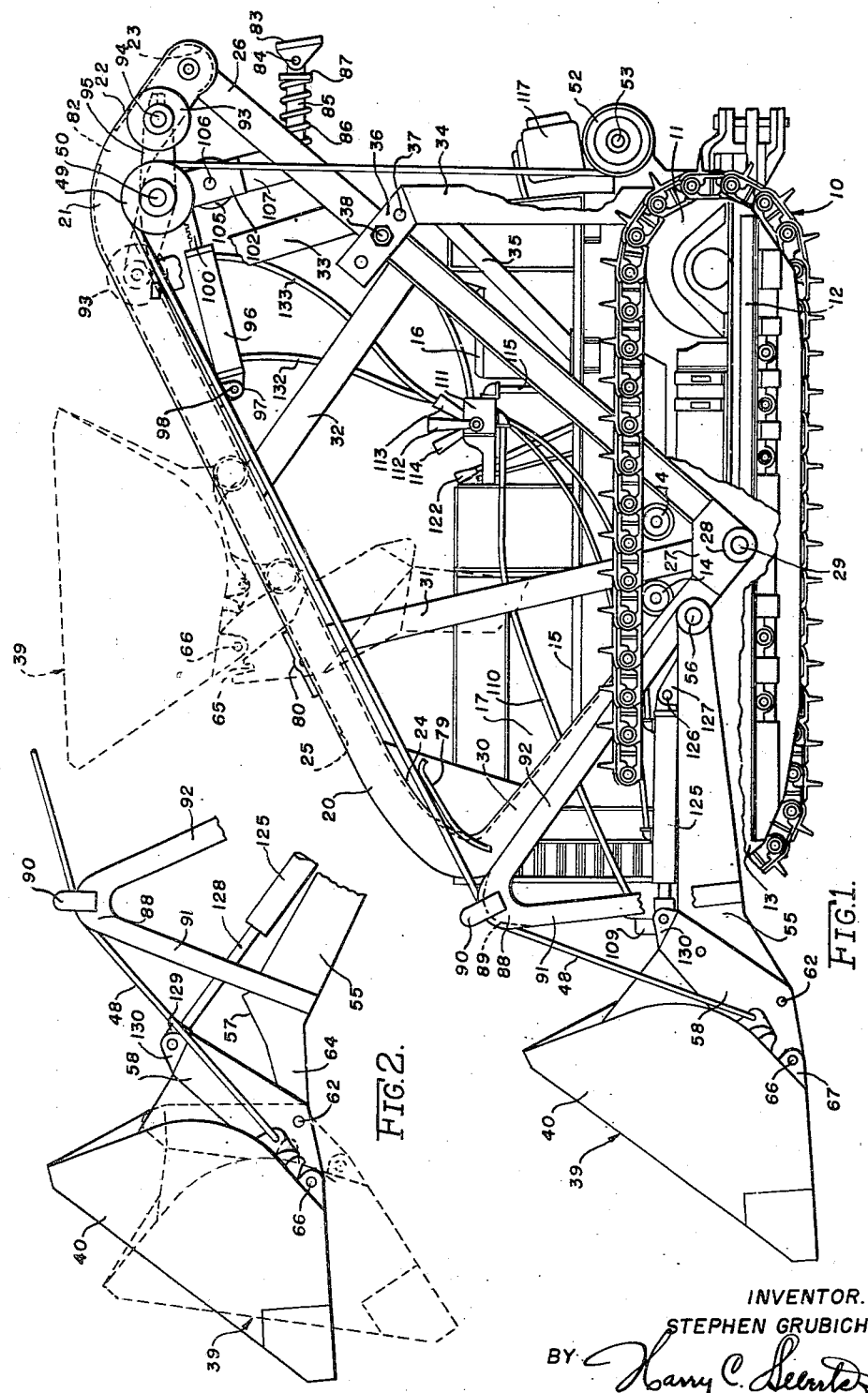
INVENTOR.
STEPHEN GRUBICH.
BY Harry C. Selwter
ATTORNEY Nov. 13, 1945.    S. GRUBICH    2,389,044
MATERIAL DIGGING AND HANDLING APPARATUS
Filed June 27, 1944    4 Sheets-Sheet 2
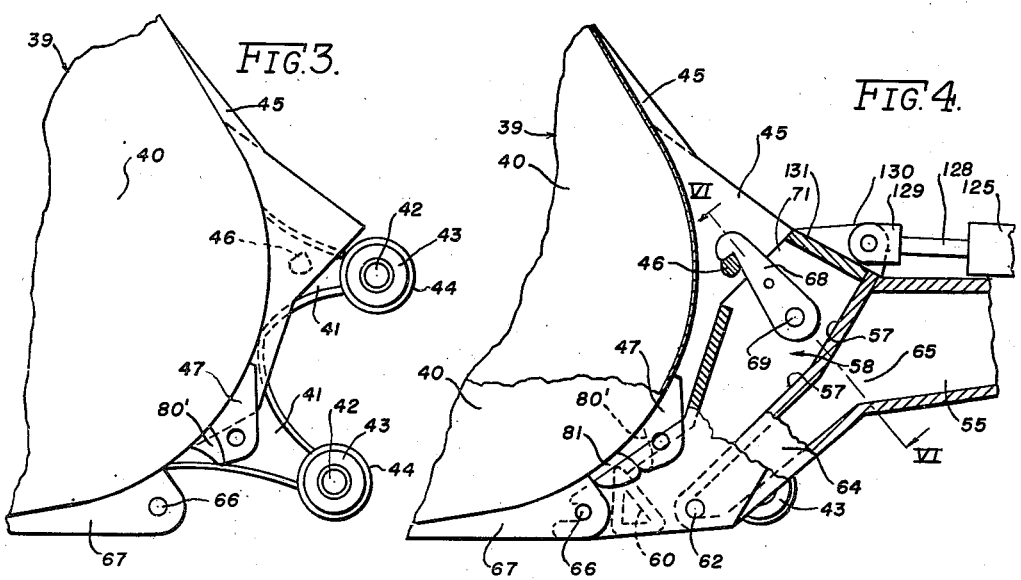
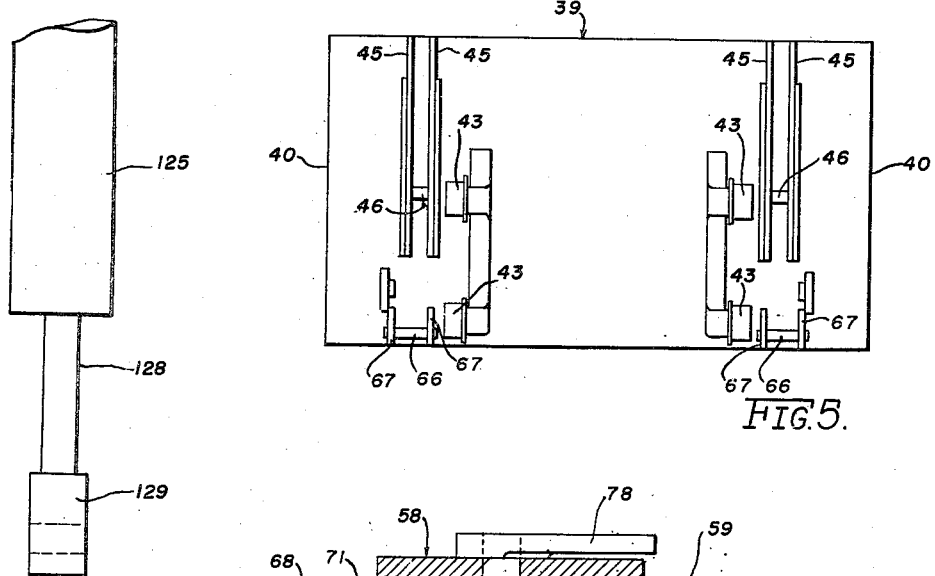
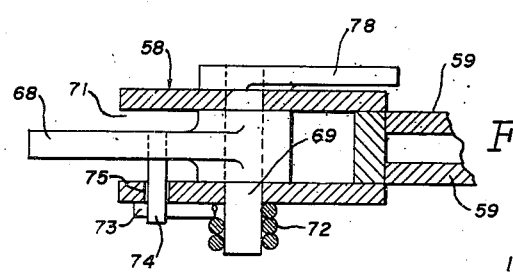
INVENTOR.
STEPHEN GRUBICH.
BY Harry C. Beerts
ATTORNEY Nov. 13, 1945.   S. GRUBICH   2,389,044
MATERIAL DIGGING AND HANDLING APPARATUS
Filed June 27, 1944   4 Sheets-Sheet 3
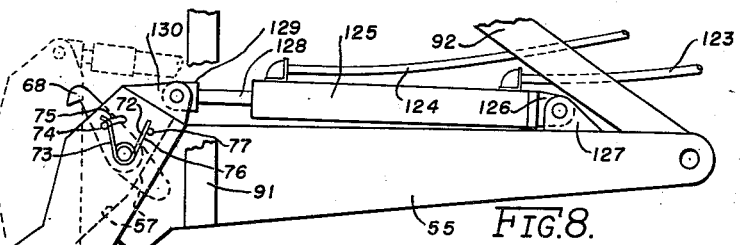
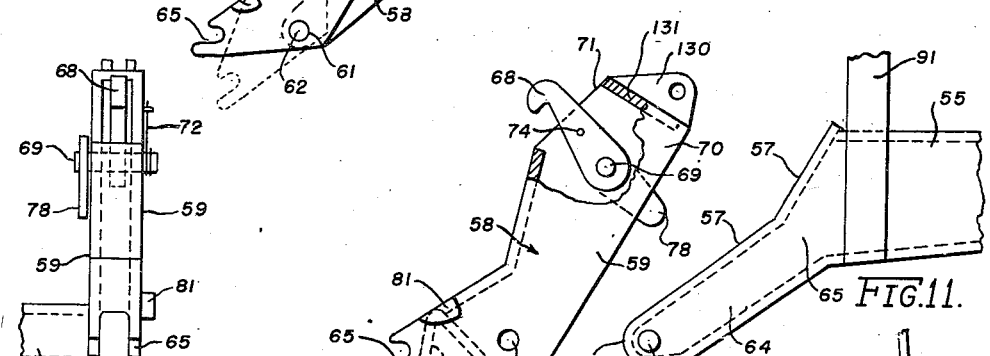
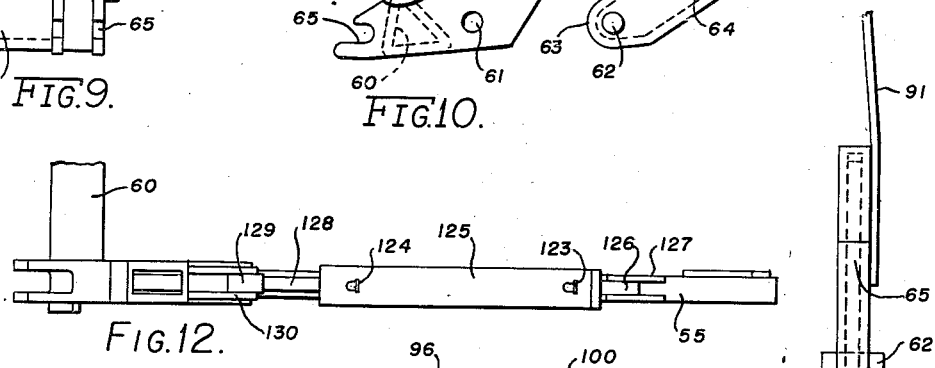
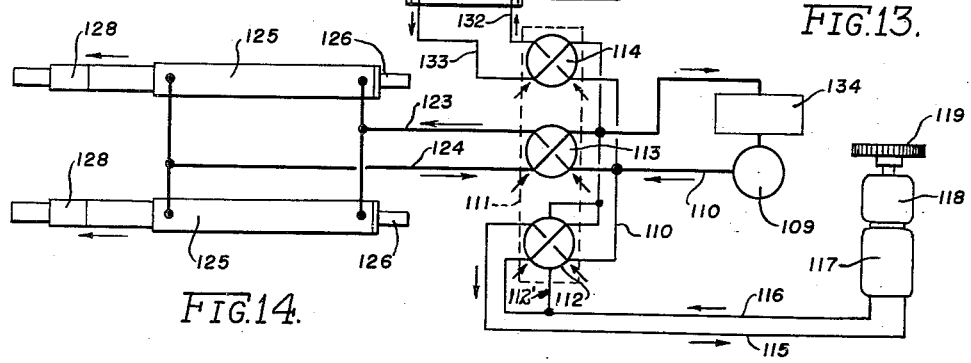
INVENTOR.
STEPHEN GRUBICH.
BY Harry C. Secater
ATTORNEY.

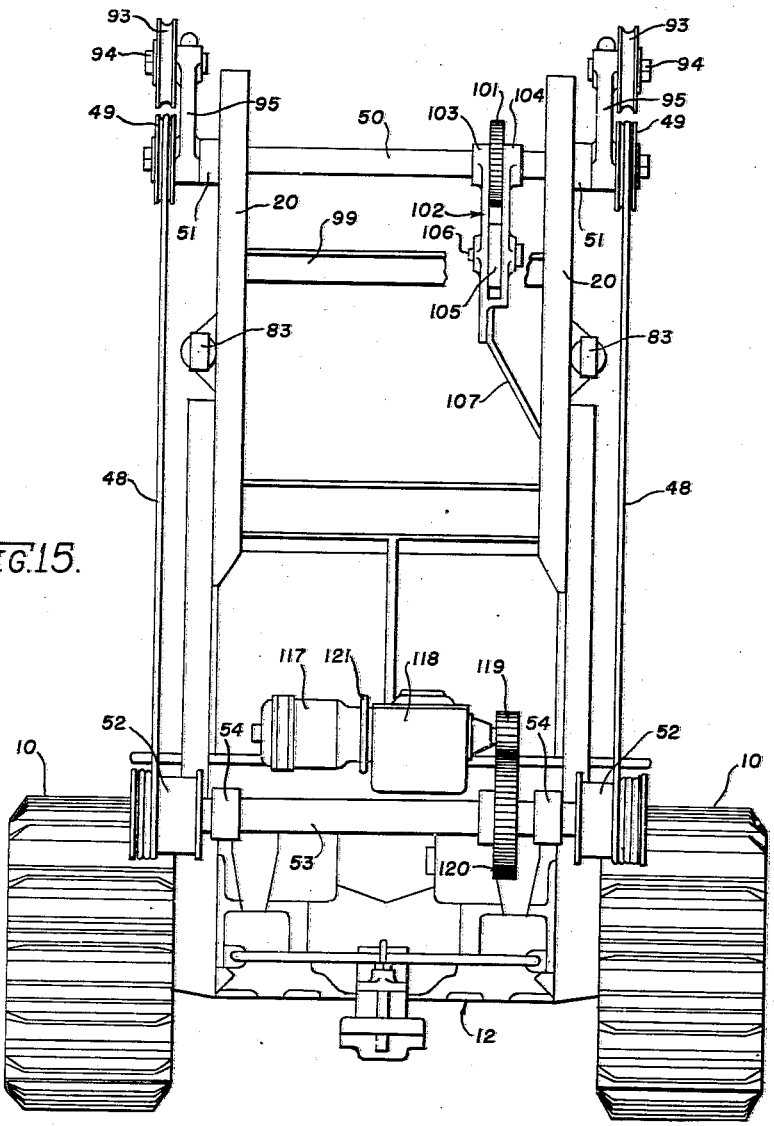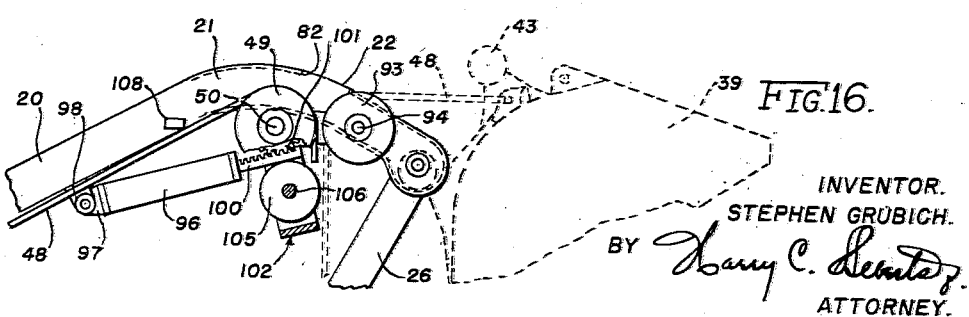

Patented Nov. 13, 1945

2,389,044

UNITED STATES PATENT OFFICE 2,389,044

MATERIAL DIGGING AND HANDLING APPARATUS

Stephen Grubich, Milwaukee, Wis.

Application June 27, 1944, Serial No. 542,311

20 Claims. (Cl. 214—103)

This invention relates to improvements in an apparatus for digging, removing and handling material and more particularly to mobile mounted hydraulically controlled shovels, and dumping attachments therefor, although certain features thereof may be employed with equal advantage for other purposes. The subject matter of this application for Letters Patent constitutes an improvement on my United States Letters Patent No. 2,344,246, issued March 14, 1944.

It contemplates more especially an automatic shovel for scooping up material in making excavations or transferring material from one position to another including the loading of trucks therewith by dumping both forward and rearward after the digging or scooping operations. It will be understood, however, that the principles of this invention may be employed in connection with the bulldozer, a blade plow and backfiller and various other apparatus for handling material which it is desired to transfer for short distances from one location to another.

In an apparatus of the character involved herein, the distribution of the weight of the shovel mechanism with or without its contents affects the loading capacity of the machine. It is, therefore, important to construct and locate the parts in a manner so that the apparatus is more or less in a balanced state during operation and does not require outrigger anchoring means which handicaps mobility and the full advantageous use thereof. It is desirable to unload the bucket or shovel quickly both forwardly as well as rearwardly and without injurious effect upon the apparatus or the trucks into which the bucket is discharged, thereby procuring maximum capacity shovel control and dumping facility with minimum wear and tear on instrumentalities which have been greatly simplified and rendered far more dependable.

One object of the present invention is to simplify the construction and improve the operation of devices of the character mentioned.

Another object is to provide an improved material digging and handling apparatus to secure increased dumping facility through both forward and rearward unloading of the bucket or material penetrating instrumentality.

Still another object is to provide novel unloading means for the digging bucket so that the unloading thereof can be accomplished both forwardly and rearwardly of the frame.

A further object is to provide improved means for moving and controlling the material digging and handling bucket both forwardly and rearwardly along the conveying track or ramp therefor.

A still further object is to provide improved means for unloading the material digging and handling bucket proximate to its forward digging position or effect the transfer thereof from its initial lifting means to a track for rearward dumping or unloading.

Still a further object is to provide novel means for unloading the material digging and handling bucket forwardly of the conveying track in conjunction with its initial lifting means normally effecting the transfer thereof to the track for rearward unloading.

An additional object is to provide improved mobile mounted digging and handling instrumentalities including simplified controls therefor to effect forward as well as improved rearward dumping operations.

Other objects and advantages will appear from the following description of an illustrative embodiment of the present invention.

In the drawings:

Figure 1 is a vertical side elevation of my improved material handling apparatus with certain portions broken away to clarify the disclosure.

Figure 2 is a fragmentary side view in elevation of the bucket, lifting and forward dumping instrumentalities and showing the dumping position thereof in dotted outline.

Figure 3 is a fragmentary side view of the shovel or bucket with the actuator or carrier plates removed.

Figure 4 is a fragmentary side view in elevation of the bucket and the lifting member with portions broken away and parts in section and showing the latching devices for attaching the bucket to the lifting member.

Figure 5 is a bottom plan view of the bucket detached from the operating instrumentalities.

Figure 6 is a fragmentary enlarged sectional view taken substantially along line VI—VI of Figure 4.

Figure 7 is an enlarged fragmentary side view in elevation of the shovel or bucket actuating ram to effect forward dumping operations.

Figure 8 is a fragmentary side view in elevation of the bucket lifting arms and forward dumping actuator therefor shown detached from the bucket and ramp displacing apparatus.

Figure 9 is an enlarged fragmentary front view of the shovel or bucket carrier.

Figure 10 is a side view in elevation of the shovel or bucket carrier shown in Figure 9, parts thereof being broken away and shown in section to clarify the showing.

Figure 11 is a fragmentary side view in elevation of the forward portion of the shovel carrier arm.

Figure 12 is a plan view of a shovel carrier, supporting arm and hydraulic ram sub-assembly shown in Figure 8, the parts thereof being individually shown in Figures 7, 10 and 11.

Figure 13 is a front view of the fragmentary corner arm shown in Figure 11.

Figure 14 is a schematic diagram of the hydraulic system and controls for controlling the dumping operations of the shovel both forwardly and rearwardly of the apparatus.

Figure 15 is an end view in elevation of apparatus shown in Figure 1, parts thereof being broken away to clarify the showing.

Figure 16 is a fragmentary side view in elevation of the hydraulic shive actuator to effect the displacement thereof relative to the ramp for affording rearward bucket dumping and return movement thereof.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a frame provided with a mobile mount of the caterpillar type having the usual endless traction chains 10 that are driven by power wheels 11 at one end of the chassis 12. The traction chains pass around large forward rollers 13 at the other end of the chassis 12 and their upper reaches are supported by intermediate idler rollers 14. The body of the tractor is provided with a platform 15 upon which the power instrumentalities are mounted. At the rear of the platform there is a seat 16 for the operator and within reach thereof are suitable hydraulic controls such as valves which will later be described. A suitable driving motor or engine 17 of the liquid fuel type, preferably of the internal combustion type, is mounted on the chassis 12 to effect the desired power traverse thereof through the medium of the traction chains 10.

The bucket, as has been hereinbefore stated, is adapted to travel during a portion of its cycle upon a track which guides it to its position for dumping at the rear end of the tractor. The track comprises longitudinally disposed channels 20 that are in parallel relation to each other with their flanges facing or extending inwardly, and said channels are preferably disposed in inclined planes such as shown in Figure 1 so that a ramp is provided thereby. At their upper ends the channels forming the tracks 20 have curved portions 21 that provide "humps" and terminate in tangent downwardly extended terminal portions 22 which latter, at their extremities, are provided with closed pockets shown in detail in Figure 16 to provide stops 23. The lower or other ends of the tracks have downwardly curved portions 24 and the upper flanges of the channels forming these tracks is cut away as at 25 in Figure 4 to permit implacement of the wheeled bucket on the ramp. Angle metal beams 26 extended obliquely downward from the rear ends of the tracks to corner plates 27 and the corner plates 27 have bearing bosses 28 for the pivots or trunnions 29 that project from the tractor side sills. Similar beams 30 extend downwardly from the lower front ends of the track rails and are united with the blocks 27. Suitable stays 31, 32 and 33 are connected to the triangular shaped structures just previously described and thus provide a rigid frame of the cantilever type which is disposed in the manner shown in Figure 1 and which is fulcrumed upon the trunnions 29. Vertical standards 34 arise from a suitable rear portion of the tractor and are braced by stay bars 35 as shown at the right hand of Figure 1. The upper ends of the standards have oblique portions 36 that are provided with a plurality of apertures 37 to receive the shanks of bolts 38, which bolts pass through aligned openings in the inclined frame members 26. By removing the nut from the bolts 38 the track frame may be tilted upon its trunnions 29 to adjust the angularity or incline of the ramp members, and after the desired adjustment has been made the bolts are inserted through the aligned apertures in the oblique portion 36 of the standard and the inclined frame member 26 to secure the frame in position. This adjusts the entering or pentrating position of the bucket, enables the bucket to remain level both forward and rearward when operating on steep slopes as the bucket traverses the ramp, and also puts the bucket at the proper angle for dumping at the rear so that it will be operating with the full and effective influence of gravity regardless of the terrain, slope or position that must be assumed by the traction gear, in this instance the chains 10.

The bucket comprises a hollow body 39 of elongated trough-shape having end walls 40. The under portion of the bucket 39 is provided with elongated trucks 41—41. The bucket trucks 41—41 are disposed transversely of the bucket body near the ends thereof, and these are provided with lateral stubs 42—42 upon which suitable wheels 43—43 are journalled. These wheels 43—43 are adapted to support the bucket when it is traveling upon the ramp tracks 20. The bucket wheels 43—43 are positioned on the tracks with their treads within the inwardly confronting channels between the flanges defining the tracks 20 while the annular wheel flanges 44 are disposed outside the track to assist in the guidance of the bucket 39 therealong.

The under-portion of the body of the bucket is provided with two pairs of elongated shores 45—45 that provide braces across the bottom thereof to add rigidity thereto, and the members of each pair are connected by tie-members 46—46 (Figure 5). Suitable lugs 47—47 depend from the curved under surface of the bucket body 39 near the ends thereof and are preferably located adjacent and outside the planes of the elongated shoes 45. These lugs 47—47 are provided with suitable apertures and the ends of the pulling cables 48—48 are adjustably secured therein in any suitable manner. The cables pass inwardly in an oblique direction outside of and parallel to the tracks 20 of the ramp and at the top of the latter the cables 48—48 pass over sheaves 49—49 that are rotatably mounted to idle on the adjacent extended ends of a rock shaft 50.

The rock shaft 50 is journalled in members 51 depending from the "humps" or upper arcuate portions 21 of the tracks 20, and from the sheaves 49—49 the cables 48—48 pass downwardly in a substantially vertical direction to windlasses 52—52 fixed to the ends of a drive shaft 53 (Figure 1). As will be seen in Figures 1 and 15, the drive shaft 53 is journalled in bearings 54—54 mounted upon the chassis 12 of the tractor at or adjacent the rear end thereof. The shaft 53 is driven by suitable power mechanism which will be hereinafter described.

After the bucket 39 has been loaded, in the position shown in Figure 1, it is raised by lifter arms 55—55 in a curved path until the wheels 43 of the bucket 39 pass into the side channels of the ramp tracks 20. This entrance of the bucket wheels 43 takes place in front of the forward end 25 of the upper channel flanges of the tracks 20 (Figure 1). The lifter arms 55—55 comprise elongated forwardly flaring members that are fulcrumed about their rear ends on pins 56—56 anchored in the forward ramp supporting beams 30. The outer swinging end portions of the lifter arms 55—55 are provided with angularly disposed faces 57—57 defining a substantially Y-shaped configuration to detachably receive a tiltable bucket receiving cradle 58 thereon.

The bucket receiving cradle 58 consists of pairs of spaced plates 59—59 that are maintained in proper spaced relation by means of a cross beam 60 of triangular cross-section (Figures 5 and 10). Each of the pairs of spaced plates 59 have aligned apertures 61 therethrough for mounting upon pivotal pin 62 which extend downwardly from the tip 63 of the long branches 64 of the substantially Y-shaped end 65 of the lifter arms 55 (Figure 11). The pairs of plates 59—59 that are maintained in spaced relation by the cross beam 60, fit over the trunnion 62 of the lever arms 65 for pivotal connection therewith. As shown, each of the spaced plates 59—59 of the bucket or shovel cradle 58 carries substantially V-shaped surface plates 64—64 to serve as a self centering seat for the curved bottom of the bucket 39. Beyond the cross-beam 60 the lower branches 64 of the bucket cradle 58 are provided with open sockets 65 to receive cross-pins 66—66, each extending between two small lugs 67—67 projecting from the bottom of the bucket 39. It will be noted in Figures 4 and 8 that the sockets 65 are so shaped that the lower parts thereof project beyond the ends of the upper portions which will permit the clearing of the bucket from the arms and the saddles when the bucket 39 has been lifted up to and positioned on the tracks 20.

Means are provided whereby the bucket may be temporarily or detachably connected to the respective arms. This structure comprises a latch-hook 68 fulcrumed upon a pivot 69 extending transversely across the upper branch 70 of the bucket cradle 58 and projecting out of the open end 71 thereof where it is adapted to engage with cross-pins 46 on the adjacent portions of the bucket. The latch-hooks 68 are automatically returned to their latching positions by means of spring elements 72 that are coiled around the projecting portions of the pivot pins 69 and have end portions 73 engaged with laterally extending pins 74 on the latch-hooks 68. The lateral pins 74 ride in slots 75 in the wall of the upper cradle branch 70. The other ends 76 of the springs are engaged with stop pins 77 projecting from the adjacent portions of the upper cradle branches 70 of the lifter arms 55. The pins 74 co-operating with the arcuate slot 75 limit the movement of the lever 68 in both directions (Figure 8). The ends of the pivot pins 65 project through the opposite walls of the branches 58 and are provided with trips 78. It should be understood that each lifter arm 55 is provided with latches and trip members just described.

When the windlasses or sheaves 52 are rotated the cables 48 will pull the bucket 39 upwardly with the lifter arms 55 until the bucket leading wheels 44 engage the channel tracks 20 and during a portion of this movement the trip members 78 will have engaged the respective cam pieces 79 projecting from the sides of the ramp frame adjacent the lower ends of the tracks 20 thereof. This releases the latch-hooks 68—68 from the pins 46—46 on the bucket 39, and the latter leaves the saddles or cradles 58 at the ends of the lifter arms 55. The lifter arms 55 will continue their arcuate movement until the cross-piece 60, which connects the arms, engages a spring stop 80 that is disposed transversely across the ramp. In this latter position, the pins 66 on the bucket 39 will have reached a position with respect to the sockets 65 in the ends of the lower cradle branches 59 so the pins 66 will move out of the sockets 65 while the cables continue to pull the bucket 39 up the ramp channels or tracks 20. This stage in the cycle of operation is shown in dotted lines in Figure 1. It should be noted that lugs 80' on the bottom of the bucket 39 engage with stop members 81 on the lower branches 59 of the bucket cradle 58 (Figure 10) and prevent the bucket 39 from sliding out of the saddle or cradle surfaces 64 while it is being elevated to and placed upon the ramp tracks 20.

The cables will continue to pull the bucket upwardly over the hump or curved portion 21 of the ramp, and the leading wheels 44 of the bucket 39 pass down reversely inclined extensions 22 of the ramp tracks 20 and enter the terminal portions or seats 23 thereof. In this position the leading wheels 44 of the bucket 39 are adapted to act as pivots and the weight of the bucket 39 is to the rear of the leading wheels which allows the bucket to up-end itself. In performing this movement the rear or trailing wheels 44 of the bucket 39 pass through cutaway or notched out portions 82 (Figure 16) in the upper flanges of the ramp rails or tracks 20. In the downward swing of the bucket 39 to the dumping position shown in full lines in Figure 16, the braces or ribs 45 on the body of the bucket are adapted to engage shoes 83 that are pivotally mounted as at 84 on the ends of horizontal plungers 85 suitably carried upon the ramp frame preferably by the oblique channel members 26. The plungers 85 are surrounded by springs 86 between collars 87 and the members in which the plungers are mounted to urge the plungers outwardly. This tends to cushion the impact resulting from the sudden stopping of the bucket 39 at the limit of movement during its dumping action. This cushioning will permit the operator to allow the bucket to tip suddenly and thereby dislodge and shake out substances which may tend to adhere to the walls of the bucket. As the bucket tilts backward to unload its contents it has only a limited supply of slack cable. This will allow the bucket to dump only a portion of its load. The balance of the load will be dumped as required under the control of the operator, by his use of the friction clutch in allowing the bucket to dump freely, or slowly as desired.

The arms are provided with cable engaging or guide yokes, each of which comprises a corner member 88 having a guide channel 89 in its edge and having outwardly flared lips 90 (Figures 1 and 2). These cable engaging guide yokes are preferably spaced from the lifter arms 55 by means of stays 91 and 92. The stay 91, as shown in Figure 2, extends from the corner member 88 downwardly to and is suitably secured to the bucket lifting arm 55 in any suitable manner. The other stay 92 is obliquely disposed and extends from the corner member downwardly to the bearing boss at the rear end of the lifter arm 55. The lifter arms 55 and their stays 91 and 92, together with the corner member 88, provide a triangular shaped frame bracket which constitutes a bell-crank lever of relatively large proportions (Figure 1), and the cables 48 engage in the grooves of the corner members of these bellcranks 88 at a location between the sheaves 49 and the cable attaching lugs 47 on the bucket 39. This arrangement tends to assist in the lifting movement of the lifting arms 55 when the bucket 39 is displaced upwardly from its loading position, at the left in Figure 1, to a position where the cable will be withdrawn from the yoke to provide a straight run of cable from the bucket 39 direct to the sheaves 49.

It should be noted that when the bucket 39 is elevated and displaced along the ramp 20 and over the hump 21 thereof to assume its dumping position through the pull exerted by the cables 48 thereon (Figure 16), this effects the transfer of the cables 48 from the sheaves 49 to the sheaves 93 that are journalled on shafts 94 carried by levers 95 that are anchored to the rock shaft 50 (Figures 1 and 15).

In order to start the reverse movement of the bucket 39 from dumping position (Figure 16) to its initial position (Figure 1), a hydraulic ram 96 (Figures 1 and 16) is provided with a bracket 97 at one extremity to pivotally engage a bracket 98 fixed to a cross bar 99 (Figure 15) that bridges the underside of the ramps 20 just below the hump 21 therein. The hydraulic ram cylinder 96 carries a rack 100 serving as a piston thereof to mesh with a pinion 101 that is fixed to the rock shaft 50 for rotation therewith between the ramps 20 (Figure 15). A substantially U-shaped bracket 102 terminates at its open end in bearings 103-104 (Figure 15) which are journalled on the rock shaft 50 on both sides of the spur gear 101 to receive an idler roller 105 journalled on a pin 106 carried between the spaced arms of the bearing bracket 102 to rotatively support the roller 105 in aligned confronting relation with the spur gear 101. The lower end of the bearing bracket 102 has an inclined supporting bar 107 attached thereto to rigidly secure the bearing bracket 102 at its lower end with respect to the ramp frame and particularly the inclined frame member 26 thereof. As hydraulic pressure is admitted into the cylinder 96 by the attendant as will appear more fully hereinafter, the rack 100 which meshes with the gear 101 on one side and is supported by the roller 105 on the other side thereof, is forced outwardly to rotate the gear 101 in a counter clockwise direction (view from Figures 1 and 16) to swing the lever arms 95 from their normally horizontal position to the right of the rock shaft 50 to an opposite position as shown in dotted lines which is to the left of the rock shaft 50 in Figure 1. Limit stops 108 are fixed to the side surfaces of the ramp 20 (Figure 1) to serve as a rest for the lever arms 95 as they are actuated to assume a horizontal position to the left of the rock shaft 50. In this position, the bucket pulling cables 43 will have returned to the sheaves 49 and by reason thereof the empty bucket 39 will be displaced to an upright position below the apex of the ramp hump 21 to permit its descent responsive to the urge of gravity just as soon as the cables 48 are released by the operator who controls the speed of rotation of the windlass 52 through a clutch mechanism.

After the bucket 39 gravitates down the ramp 20 and again engages with the cradle 58 fixed to the outer ends of the elevating arms 55 to return the bucket 39 to a loading position after being connected to the cradle 58 through the spring operated latch 68 described supra. When the bucket has returned to its initial loading position, the operator again actuates the hydraulic arm 96 in a reverse direction to pull in the rack 100 and return the sheaves with their lever arms 95 to their normal horizontal position to the right of the rock shaft 50 in preparation for another dumping operation for the bucket 39. So that the bucket 39 can be either dumped rearwardly as described supra or forwardly as will presently be described, suitable power devices of any desired type may be provided. For purposes of illustration, there is shown the hydraulic pump 109 at the front end of the tractor chassis 12. The pump 109 is adapted to be operated by the engine 17 in any suitable manner.

Pipe lines 110 lead to a control mechanism 111 having valves 112, 113, and 114, in this instance three, provided in the hydraulic system to provide the desired operation and control of the instrumentalities as will appear more fully hereinafter. Pipe lines 115—116 extend between the control valve 112 and the hydraulic motor 117 (Figure 14). The shaft of the hydraulic motor 117 connects with a speed reducer 118 that rotates a pinion 119. A flanged ring 121 is disposed between the motor 117 and the speed reducer 118 to enable their direct connection and mounting. The pinion 119 meshes with a spur gear 120 carried by a driven shaft 53 to which the windlasses or cable sheaves 52 are attached. The hydraulic motor 117 is connected to the valve 112 by lines 115 and 116. Valves 112, 113 and 114 permit the oil to flow forward or backward through the pipes leading to plungers 100 and/or 128 and/or motor 117 or lock the lines so that no oil can enter or leave; therefore, the fluid motor 117 can be operated in a clockwise or counterclockwise direction or be held stationary to act as a brake to maintain the bucket 39 or other hydraulically operated instrumentalities in any desired position.

By slowly actuating the valve handles, this braking action can be accomplished very smoothly, since the oil pump 109 is of variable displacement type wherein the resistance set up by opening a valve to actuate the plungers 100—128 or motor 117 increases the oil pressure which, in turn, automatically moves the stator ring in a vane type pump to a more concentric position with relation to the vane rotor, thereby reducing the displacement as the pressure increases. These operating characteristics of variable displacement hydraulic pumps are very well known, since there are many of standard construction and design which would be suitable for the purpose set forth, namely to provide low speed under loading conditions such as when the bucket 39 is proceeding with its digging operation, and to increase the speed when the load is reduced after digging has terminated and the bucket 39 is moved from its digging position for dumping such as along the ramp 20 to the rear dumping position and back again.

It should be noted that the valve 112 has a bleeder line 112' between it and the line 116 constituting the return from the fluid motor 117. The bleeder line 112' permits the fluid motor to coast when the bucket 39 returns down the inclined ramp 20 to reel out cable 48 over the windlasses or sheaves 52. The valve 112, however, is adapted to open at a predetermined pressure to allow the fluid to actuate the motor 117. Thus the power on the windlasses or sheaves 52 may be doubled while the speed of the windlasses or sheaves 52 is reduced by practically one-half during the upward traverse of the bucket 39 for dumping from the ramp 20. So that the tractor chassis 12 may be moved through the operation of the chains 10 in one or the other direction to bring the bucket 39 into the desired situs and position, a suitable manual transmission control lever 122 (Figure 1) is provided within easy reach of the operator to direct the forward or rearward traverse of the chains 10 responsive to the operation of the tractor engine 17.

In order to pivotally actuate the bucket 39 in its forward position to effect dumping, another valve 113 is provided to control the fluid pressure from the pump 109 through lines 123—124 to the ram cylinders 125—125, in this instance two, which are pivoted at their ends 126—126 to brackets 127—127 fixed proximate to the pivots 56 to lifter arms 55 (Figure 8). The cylinders 125 have projecting piston rods 128—128 that terminate in bosses 129—129 which are pivotally connected to brackets 130—130 fixed to the bucket cradle or carrier 58 along the upper inclined end 131 thereof. As a result, the operator can tilt the bucket 39 with its cradle or carrier 58 that pivots about pins 62 projecting laterally from the lower ends of the lifter arm branches 64 (Figure 11) to dump the bucket 39 in any forward position whether such be elevated or lowered within the limits of pivotal movement of the lifter arms 55 (Figure 2).

The hydraulic valve 114 connects through pipes 132—132 with the hydraulic ram 96 to control the operation of the rack 100 which swings the sheave supporting arms 95 from one or the other of its extreme horizontal positions. It should be noted that the hydraulic pipe lines described supra lead back to a reservoir or tank 134 that connects with the pump which is in the closed hydraulic system (Figure 14). When the rock shaft 50 displaces the lever arms 95 to its extreme horizontal counter clockwise position (Figure 1), to transfer the cables 48 from sheaves 93 back to sheaves 49, the bucket 39 will be elevated from its rearward dumping position to a position just below the ramp hump 21. This takes place because the bucket moving cables 48 are taut around the sheaves 93 between the bucket 39 and the windlasses 52 and this swing of the lever-arms 95 will pull the bucket 39 back from its rearward dumping position, thereby restoring the released bucket wheels 44 to the track 20 and moving the bucket 39 a suitable distance forwardly to the apex or just beyond the humps 21 of the tracks 20. Thereafter, the bucket 39 may be gravitated down the ramp 20 by either reversing the fluid motor 117 and reeling out cable 48 or by opening both lines 115—116 for circulation of oil which allows gravity to pull on the cable 48 and reverse the fluid motor 117.

It should be observed that the pump 109 is of the variable displacement type of which there are a number of suitable standard construction wherein a spring (not shown) holds a stator ring off center (not shown) against a blade rotor to produce the pumping action. The spring is adjusted by a screw so a maximum pressure range of from 50 to 1000 pounds per square inch may be obtained. The spring tends to hold the stator ring offset to produce maximum displacement until a pressure is built up in the line. The pressure is piped to a plunger under the spring and as the pressure increases, the spring is forced back until the stator ring becomes concentric with the blade rotor when the displacement becomes zero; however, the pressure is maintained with only enough oil actually delivered to offset leakage.

When there is no load on the windlasses or sheaves 52 or plungers 100—128, the oil is forced from the pump 109 to the reservoir 134 and back again. When this path is broken by opening one of the control valves 112, 113 or 114 to furnish hydraulic power to actuate one or the other of the fluid pressure responsive devices, pressure is built up in the line and the displacement drops until maximum pressure is reached. Under these conditions, the pump 109 will rotate and hold the load without any oil being delivered.

The fluid pressure responsive plungers 100—128 are double acting and the fluid motor 117 that operates the windlasses 52, can operate in both the clockwise and counterclockwise direction under power; therefore, the hydraulic valves 112, 113, and 114 have three positions, namely forward, reverse and lock. The valve 112 for the fluid motor 117 also has a fourth position for permitting the cable 48 to reel out and exert a pull to reverse the motor 117 after dumping the bucket 39 in its extreme rearward position. With both lines closed on the plungers 100—128 and fluid motor 117, the oil is locked and the valves 112, 113, and 114 can then be utilized as a clutch or brake by slow opening or closing. Consequently, no clutch or brake is required to operate the hydraulic responsive devices and their actuators. To repeat, the bucket 39 can be moved down the ramp 20 to return it to its initial position after the dumping thereof has been effected, by either reversing the fluid motor 117 or paying out cable 48 or by opening both lines for circulation of oil to permit gravity to effectively exert a pull on the cables 48, thereby reversing the oil or fluid motor 117 which coasts while oil circulation is effected through the bleeder line 112'. This permits the bucket 39 to move down the inclined ramp 20.

Upon reaching the lifter arms 55 which were left in their upright or extreme clockwise position (viewed from Figure 1), the pins 66 will enter the sockets 65 and the lifter arms 55 will begin their return swing downwardly to their initial or loading positions and the bucket 39 will become seated in the cradle or saddle 58 pivotally connected to the branches 64—65 of the lifter arms 55. When the bucket 39 is passing the cam plates 79, the trip 78 will release the latch-hooks 68 so that the latter will engage the cross-pins 46, thereby locking the lifter arms 55 and cradle 58 to the bucket 39.

While I have illustrated and described a preferred embodiment of this invention, it must be understood that this invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a material handling apparatus, the combination with a frame, of a runway on said frame, a bucket adapted to traverse said runway during a portion of its cycle of operation; actuating means adapted to move said bucket in its aforesaid cycle; rigid arm means engageable with said bucket and operable responsive to said actuating means for lifting said bucket and guiding it to and from said runway; said bucket being detachably and pivotally associated with said rigid arms, power means for pivotally actuating said bucket while associated with said rigid arm means for digging and dumping displacement thereof independent of said runway, and means on said runway for disengaging said rigid arm lifting means from the bucket during the travel of said bucket on said runway.

2. In a material handling apparatus, the combination with a frame, of a runway on said frame, a bucket adapted to traverse said runway during a portion of its cycle of operation, actuating means adapted to move said bucket in its aforesaid cycle, fulcrumed reciprocable rigid arm means engageable with said bucket and operable responsive to said actuating means for lifting said bucket and guiding it to and from said runway, said bucket being detachably and pivotally associated with said rigid arm means, power means for controlling the pivotal position of said bucket relative to said rigid arm means independent of said runway, and means for disengaging said fulcrumed means from the bucket during the travel of said bucket on said runway.

3. In a material handling apparatus, the combination with a frame, of a runway on said frame, a bucket adapted to traverse said runway during a portion of its cycle of operation, actuating means adapted to move said bucket in its aforesaid cycle, rigid arms fulcrumed on said frame and movable responsive to said actuating means, said bucket being detachably and pivotally associated with said rigid arms, the free portions of said arms adapted to lift said bucket and guide it to and from said runway, power means for pivotally actuating said bucket while associated with said rigid arm means for digging and dumping displacement thereof independent of said runway, and means for disengaging said arms from the bucket during the travel of said bucket on said runway.

4. In a material handling apparatus, the combination with a frame, of a runway on said frame, a bucket adapted to traverse said runway during a portion of its cycle of operation, actuating means adapted to move said bucket in its aforesaid cycle, rigid arms fulcrumed on said frame below said runway and movable responsive to said actuating means, a bucket supporting cradle pivotally connected to said arms, power means for pivotally actuating said cradle relative to said arms independent of said first named actuating means, said arms adapted to lift said bucket and guide it to and from said runway, latching devices detachable connecting said bucket to said cradle, and means for releasing said latching devices whereby said arms and cradle are detached from said bucket during the travel of said bucket on said runway.

5. In a material handling apparatus, the combination with a frame, of a runway on said frame, a bucket adapted to traverse said runway during a portion of its cycle of operation, a cable connected to said bucket and adapted to move said bucket in its aforesaid cycle; power devices for moving said cable; rigid arm means pivotally connected to said frame, a bucket supporting cradle pivotally mounted to said rigid arm means, power means for pivotally actuating said cradle relative to said rigid arms for digging and dumping displacement of said bucket, means for detachable engaging said bucket to said cradle, said rigid arm means being pivotally displaceable with said bucket responsive to the movement of said cable for lifting said bucket and guiding it to and from said runway, and means on said frame for disengaging said lifting means from the bucket during the travel of said bucket on said runway.

6. In a material handling apparatus, the combination with a frame, of a runway on said frame, a bucket adapted to traverse said runway during a portion of its cycle of operation, a cable connected to said bucket and adapted to move said bucket in its aforesaid cycle, power devices for moving said cable, fulcrumed reciprocable rigid arm means engageable with said bucket and operable responsive to the movement of said cable for lifting said bucket and guiding it to and from said runway, means for disengaging said fulcrumed lifting means from the bucket during the travel of said bucket on said runway to its extreme rearward dumping position where said bucket tilts for partial removal from said runway, and power means including a hydraulically operated rack for returning said bucket from its extreme rearward dumping position to fully engage said runway in a position for gravitation downwardly therealong.

7. In a material handling apparatus, the combination with a frame, of a runway on said frame, a bucket adapted to traverse said runway during a portion of its cycle of operation, a cable connected to said bucket and adapted to move said bucket in its aforesaid cycle; power devices for moving said cable, rigid arms fulcrumed on said frame and movable responsive to the movement of said cable, said arms adapted to lift said bucket and guide it to and from said runway, means for disengaging said arms from the bucket during the travel of said bucket on said runway, means on said runway to permit the tilting of said bucket partially from said runway to assume a dumping position, and power operated rigid means independent of said first named power devices for returning said bucket from its tilted dumping position to fully engage said runway in a position for gravitation therealong.

8. In a material handling apparatus, the combination with a frame, of a runway on said frame, a bucket adapted to traverse said runway during a portion of its cycle of operation, a cable connected to and adapted to move said bucket in its aforesaid cycle, a windlass for moving said cable, power means for rotating said windlass, rigid arms fulcrumed on said frame, a bucket receiving cradle pivotally mounted on said rigid arms, hydraulic means for pivoting said cradle relative to said rigid arms for digging and dumping displacement of said bucket, said bucket being detachably connected to said cradle, said rigid arms being responsive to the movement of said cable when said bucket is attached thereto, said arms adapted to lift said bucket and guide it to and from said runway, latch means for detachably connecting said arms to said bucket, and means for operating said latch means to disengage said bucket from said cradle during the travel of said bucket on said runway.

9. In a material handling apparatus, the combination with a frame, of a runway on said frame, a bucket adapted to traverse said runway during a portion of its cycle of operation, cables connected to and adapted to move said bucket in its aforesaid cycle, rigid arms fulcrumed on said frame, a saddle at the free ends of said arms adapted for detachable connection with said bucket, said arms movable responsive to the movement of said cables and thereby adapted for guiding said bucket to and from said runway, power means for winding and unwinding said cable, means on said saddle providing attachment to said bucket, power means for pivotally actuating said bucket while associated with said rigid arm means for digging and dumping displacement thereof independent of said runway, and means on said runway in the path of said attaching means for disengaging said saddle from the bucket during the travel of said bucket on said runway.

10. In a material handling apparatus, the combination with a frame, of spaced tracks providing a ramp on said frame, a material digging and carrying bucket, wheels on said bucket adapted for operation on said tracks during the cycle of operation of said bucket to and along said ramp, fulcrumed rigid arm means operable responsive to said actuating means for guiding the bucket to said tracks, means for disengaging said fulcrumed means from the bucket during the travel of said bucket on said tracks, a downwardly curved portion on said tracks to invert said bucket to dumping position simultaneous with certain of said bucket wheels leaving said tracks, and power operated gear means for returning said bucket to a position of gravitation on said track.

11. In a material handling apparatus, the combination with a frame, of spaced tracks providing a ramp on said frame, a material digging and carrying bucket, wheels on said bucket adapted for operation on said tracks during the cycle of operating of said bucket on said frame, cables connected to said bucket, actuating means for moving said cables to pull said bucket up said ramp for overhead rear dumping, fulcrumed rigid arm means operable responsive to said actuating means for transferring said bucket from a loading position to said tracks, a pivotal cradle on said rigid arms for detachable engagement of said bucket therewith, power means for pivoting said cradle with said bucket attached thereto for digging and front dumping displacement thereof independent of said ramp, and means for disengaging said bucket from said fulcrumed cradle when said bucket reaches said tracks.

12. In a material handling apparatus, the combination with a frame, of spaced tracks providing a ramp on said frame, a material digging and carrying bucket provided with wheels adapted to move said bucket in its cycle of operation, rigid lifter arms fulcrumed on said frame for guiding the bucket from loading position to said ramp, said bucket being detachably and pivotally connected to said rigid lifter arms, means for pivotally actuating said bucket relative to said lifter arms, means for disengaging said lifter arms from the bucket during the travel of said bucket upon said ramp, and power operated gear means for effecting the return movement of said bucket along said ramp and onto said rigid lifter arms.

13. In a material handling apparatus, the combination with a frame, of a runway on said frame, a material digging and carrying bucket provided with wheels adapted for operation upon said runway during a portion of the cycle of operation of said bucket, means adapted to actuate said bucket to dump the contents therefrom in both its loading and its unloading positions, rigid arm bucket lifting means for displacing said bucket from its loading position to said runway, power means for pivotally actuating said bucket while associated with said rigid arm means for digging and dumping displacement thereof independent of said runway, and means for disengaging said bucket from said lifting means during the transference of said bucket to said runway.

14. In a material handling apparatus, the combination with a frame, of an inclined ramp on said frame, a material digging and carrying bucket adapted to traverse said ramp, a cable for moving said bucket up said ramp, a sheave at the upper portion of said ramp with which said cable is engaged during upward movement of said bucket, a rock-shaft, means adjacent said rock-shaft adapted to tilt said bucket, a second sheave bodily movable with said rock-shaft and adapted to be engaged by said cable upon the tilting of said bucket, and power operated rack means meshing with a gear on said rock-shaft to bodily move said second sheave while it is engaged with said cable and thereby restore said bucket to a non-tilted position.

15. In a material handling apparatus, the combination with a frame, of inclined ramp on said frame, a material digging and carrying bucket adapted to traverse said ramp, a cable for moving said bucket up said ramp, a sheave at the upper portion of said ramp with which said cable is engaged during upward movement of said bucket, a rock-shaft, means adjacent said rock-shaft adapted to tilt said bucket, a lever-arm fixed to said rock-shaft, a second sheave journalled on said lever-arm in a position to be engaged by said cable upon the tilting of said bucket, power means for pivotally actuating said bucket while associated with said rigid arm means for digging and dumping displacement thereof independent of said ramp, and rigid power operated means for rotating said rock-shaft to bodily move said second sheave while it is engaged with said cable and thereby return said bucket to said ramp from said track.

16. In a material handling apparatus, the combination with a frame, of an inclined ramp, a material digging and carrying bucket adapted to traverse said ramp, a cable for moving said bucket up said ramp, an oppositely inclined track on said ramp to tilt said bucket to a rear dumping position on said ramp, means at the upper portion of said ramp with which said cable effects the return of said bucket to said ramp from the dumping track portion thereof, rigid digging arms for adjustably carrying said bucket, and means for adjusting said bucket while connected to said rigid arms to displace said bucket to a front dumping position thereon independent of said inclined ramp.

17. In a material handling apparatus, the combination with a frame, of inclined ramp on said frame, a material digging and carrying bucket adapted to traverse said ramp, a cable for moving said bucket up said ramp, an oppositely inclined track at the upper end of said ramp adapted to receive and tilt said bucket to assume a rear dumping position on said ramp responsive to said cable, rigid arms pivotally mounted to said frame, said bucket being detachably and pivotally associated with said rigid arms, means for returning said bucket from said dumping position on said ramp for re-connection to said rigid arms, and means for pivoting said bucket while associated with said rigid arms to assume a front dumping position independent of said ramp.

18. In a material handling apparatus, the combination with a frame, of an inclined ramp on said frame, a material digging and carrying bucket adapted to traverse said ramp, means at the upper end of said ramp adapted to tilt said bucket to assume a dumping position on said ramp, means for disconnecting said bucket from said rigid arms while transference thereof is effected onto said ramp, means for tilting said bucket about its pivotal connection with said rigid arms to assume a dumping position thereon, and power operated rack means for returning said bucket from its tilted dumping position on said ramp to assume a position along said inclined ramp enabling gravitation therealong for connection with said rigid arms.

19. In a material handling apparatus, the combination with a frame, of an inclined ramp, a material digging and carrying bucket adapted to traverse said ramp, an oppositely inclined track at the upper end of said ramp adapted to tilt said bucket into a dumping position on said ramp, an elongated cable for moving said bucket on said ramp, a rocker arm fulcrumed at the upper portion of said ramp, a sheave rotatably carried by the movable portion of said rocker arm, said sheave adapted to be engaged by a portion of said elongated cable when said bucket is disposed on said downwardly inclined track, a rack having operative connection with said rocker arm, and a hydraulic ram for displacing said rack which imparts rotation to said rocker arm thereby removing said bucket from said oppositely inclined track portion to said inclined ramp.

20. In a material handling apparatus, the combination with a vehicle frame, of a ramp on said frame, rigid arms pivoted to said frame, material penetrating and conveying means detachably pivotally associated with said rigid arms, means for displacing said last named means between said rigid arms and ramp and therealong to assume a rear dumping position thereon, means for pivoting said material penetrating and conveying means relative to said rigid arms to assume a front dumping position thereon independent of said ramp, means for causing said material penetrating and conveying means to assume a dumping position on said ramp, and means for returning said material penetrating and conveying means from its dumping position on either said ramp or said rigid arms.

STEPHEN GRUBICH.